US007544040B2

(12) United States Patent
Marke et al.

(10) Patent No.: US 7,544,040 B2
(45) Date of Patent: Jun. 9, 2009

(54) SUPPORT STRUCTURE IN A TURBINE OR COMPRESSOR DEVICE AND A METHOD FOR ASSEMBLING THE STRUCTURE

(75) Inventors: Gunnar Marke, Trollhättan (SE); Jan-Erik Andreasson, Trollhättan (SE); Bo Johansson, Västra Tunhem (SE)

(73) Assignee: Volvo Aero Corporation, Trollhättan (SE)

( * ) Notice: Subject to any disclaimer, the term of this patent is extended or adjusted under 35 U.S.C. 154(b) by 130 days.

(21) Appl. No.: 11/551,707

(22) Filed: Oct. 21, 2006

(65) Prior Publication Data

US 2007/0140845 A1 Jun. 21, 2007

Related U.S. Application Data

(63) Continuation of application No. PCT/SE2004/000824, filed on May 27, 2004.

(51) Int. Cl.
*B23P 15/04* (2006.01)

(52) U.S. Cl. ................. 415/142; 416/213 R; 29/889.22

(58) Field of Classification Search ............. 416/213 R; 29/889.22, 889.23, 889.2, 889.21; 415/232, 415/191, 142
See application file for complete search history.

(56) References Cited

U.S. PATENT DOCUMENTS 2,463,340 A * 3/1949 Wiberg .................... 29/889.21
5,056,738 A 10/1991 Mercer et al.
5,284,011 A 2/1994 Von Benken
6,542,843 B1 * 4/2003 Metzinger et al. ........... 702/113
6,619,916 B1 * 9/2003 Capozzi et al. ............. 415/191

FOREIGN PATENT DOCUMENTS

DE 0924389 A2 6/1999

OTHER PUBLICATIONS

International Search Report from corresponding International Application No. PCT/SE2004/000824.
International Preliminary Examination Report from corresponding International Application PCT/SE2004/000824.

* cited by examiner

*Primary Examiner*—Richard Edgar
(74) *Attorney, Agent, or Firm*—WRB-IP LLP

(57) ABSTRACT

The present invention relates to a support structure and a method for assembling a support structure in a turbine or compressor engine for rotatably supporting a rotor member in a stator member. The support structure includes an inner ring, an outer ring and a plurality of struts which extend radially between the inner ring and the outer ring. The inner ring has integrated portions projecting in the direction of the struts and forming end connections for the struts. The integrated end connecting portions of the inner ring are together with the ring made by a metal alloy having initially oversized cross sectional dimensions relative to the cross sectional dimensions of corresponding strut, followed by working at least one lateral surface for removing material. The purpose is to achieve final dimensions and position to conform to the cross sectional dimensions and correct position of each corresponding strut.

7 Claims, 5 Drawing Sheets

SUPPORT STRUCTURE IN A TURBINE OR COMPRESSOR DEVICE AND A METHOD FOR ASSEMBLING THE STRUCTURE

The present application is a continuation of International Application No. PCT/SE2004/000824, filed May 27, 2004, which is incorporated by reference.

BACKGROUND OF THE INVENTION

The present invention relates to a support structure in a turbine or compressor device. The invention further relates to a method for assembling such a support structure.

The term turbine device is intended to mean a machine in which the energy present in a flowing fluid (gas, vapor or liquid) is converted into rotational energy by means of blades or vanes. The term compressor device is intended to mean a machine having an inverse function, that is to say rotational energy is converted by means of blades or vanes into kinetic energy in a fluid. The device comprises a rotor and a stator interacting therewith.

In the following, the device comprises a turbine device, which in turn forms part of a gas turbine. This is a preferred but in no way restrictive application of the invention. The term gas turbine is intended to mean a unit which at least comprises a turbine wheel and a compressor wheel driven by the former, together with a combustion chamber. Gas turbines are used, for example, as engines for vehicles and aircraft, as prime movers for vessels and in power stations for generating electricity.

The rotor may take the form both of a radial rotor and an axial rotor.

The term elongate rotor member is here intended to mean the rotor shaft and any further components intended to rotate on the rotor shaft, such as bearings and spacers between the bearings and gears.

For the support of the rotor member in the stator member of a turbine or compressor and for allowing the high speed flow of gas through the engine the support structure includes a number of radially inner and outer support rings, the inner and outer rings being interconnected by means of radially extending struts. Down stream relative to at least some of the struts flap airfoils are positioned, see for example U.S. Pat. No. 6,619,916, and the interrelationship between the struts and corresponding flaps necessiates a thorough positioning of the struts. For different reasons the inner and outer support rings are preferably manufactured as separate components by casting metal alloy. The struts can be made by metal alloy extrusion or by forming a sheet metal as separate components which are assembled by welding or soldering at each ends with the inner ring and the outer ring. However casting involves normally high tolerances and problems with the accurate positioning of the struts relative to the flap airfoils.

It is desirable to provide a support structure which provides an accurate positioning of the struts between the inner and outer ring.

According to an aspect of the present invention, a support structure in a turbine or compressor engine for rotatably supporting a rotor member in a stator member includes an inner ring, an outer ring, and a plurality of struts which extend radially between the inner ring and the outer ring, at least one of the rings having integrated portions projecting in a direction of the struts and forming end connections for the struts, wherein the end connecting portions of the at least one of the rings are together with the ring made by casting a metal alloy having initially oversized cross sectional dimensions relative to the cross sectional dimensions of a corresponding strut and having at least one lateral surface worked for removing material so as to achieve final dimensions and positioning to conform to the cross sectional dimensions and positioning of each corresponding strut.

According to another aspect of the present invention, a method for assembling a support structure in a turbine or compressor engine for rotatably supporting a rotor member in a stator member is provided, the support structure including an inner ring, an outer ring and a plurality of struts which extend radially between the inner ring and the outer ring, at least one of the rings having integrated portions projecting in a direction of the struts and forming end connecting portions for the struts. According to the method, the end connecting portions of the at least one of the rings are cast together with the ring using a metal alloy having initially oversized cross sectional dimensions relative to the cross sectional dimensions of corresponding strut. At least one lateral surface is worked for removing material, so as to achieve final dimensions and positioning to conform to the cross sectional dimensions and positioning of each corresponding strut.

By forming an integrated over-sized projecting portion of the inner and/or outer ring and determining the accurate position of each strut where-after the projecting portion can be finally determined as to its position and dimensions by material working off part of each projection.

BRIEF DESCRIPTION OF THE DRAWINGS

The invention will be described in more detail below with reference to the embodiment as shown in the drawings attached.

DETAILED DESCRIPTION

Figure 1:
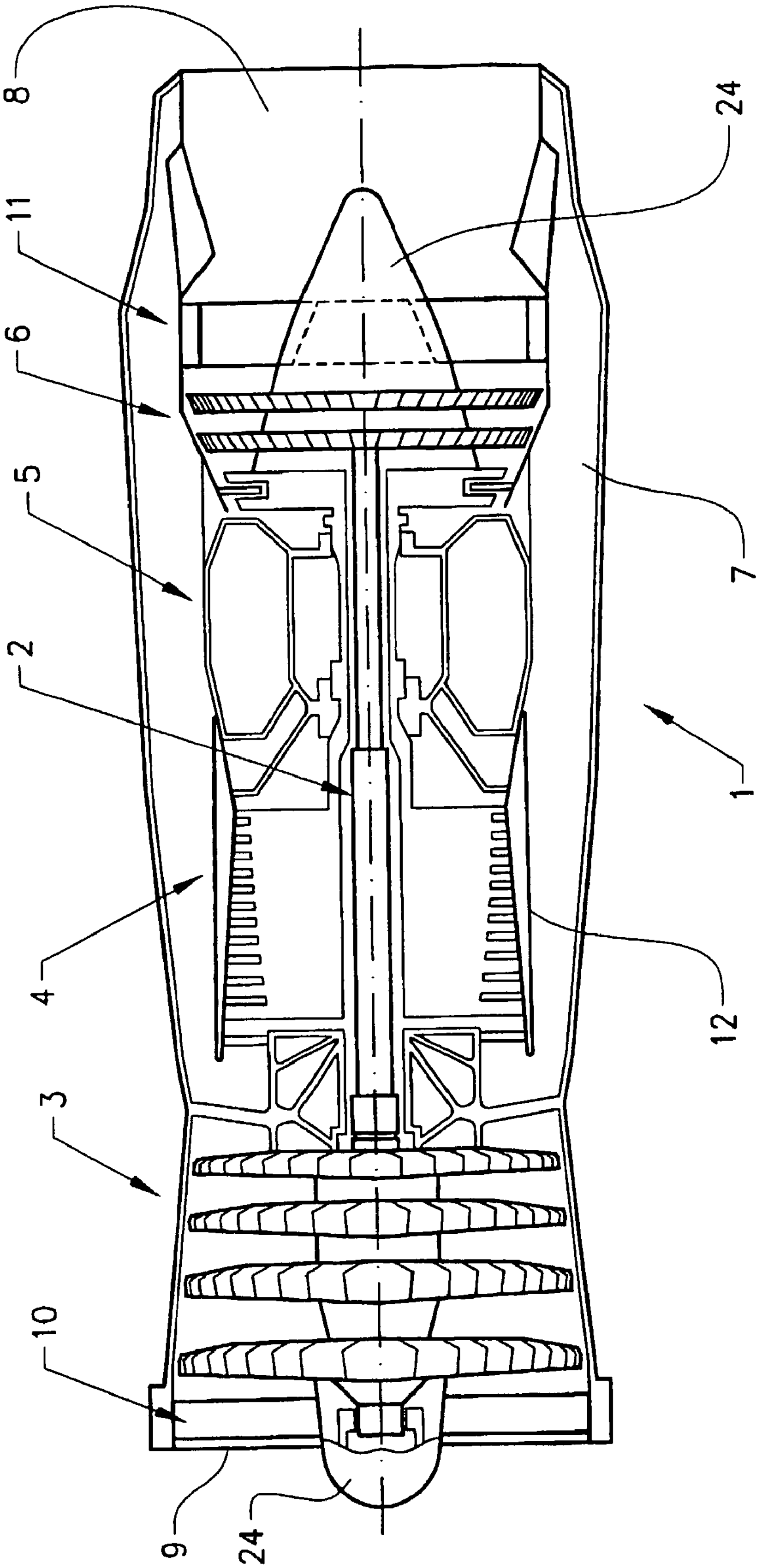
FIG. 1 is a schematic broken view of a gas turbine engine which can be provided with a support structure according to the present invention.

FIG. 1 shows a gas turbine having a stator 1 and a rotor 2 rotatably journalled in the stator. The stator consists of and encloses different units know per se such as a fan unit 3 consisting of a number of fans, a compressor unit 4 consisting of a number of compressor stages, a combustion unit 5 and a turbine unit 6 consisting of a number of turbines. The stator comprises a tubular housing 7 having an inlet end 8 and an outlet end 9. The stator further includes support structures 10, 11 for supporting the rotor 2. For example the support structure at the inlet end can form an inlet portion 10 and an outlet portion 11 at the outlet end 9. The two support structures 10, 11 are combined with further support structures, all support structures supporting bearings for the rotational shaft 12 of the rotor.

Figure 2:
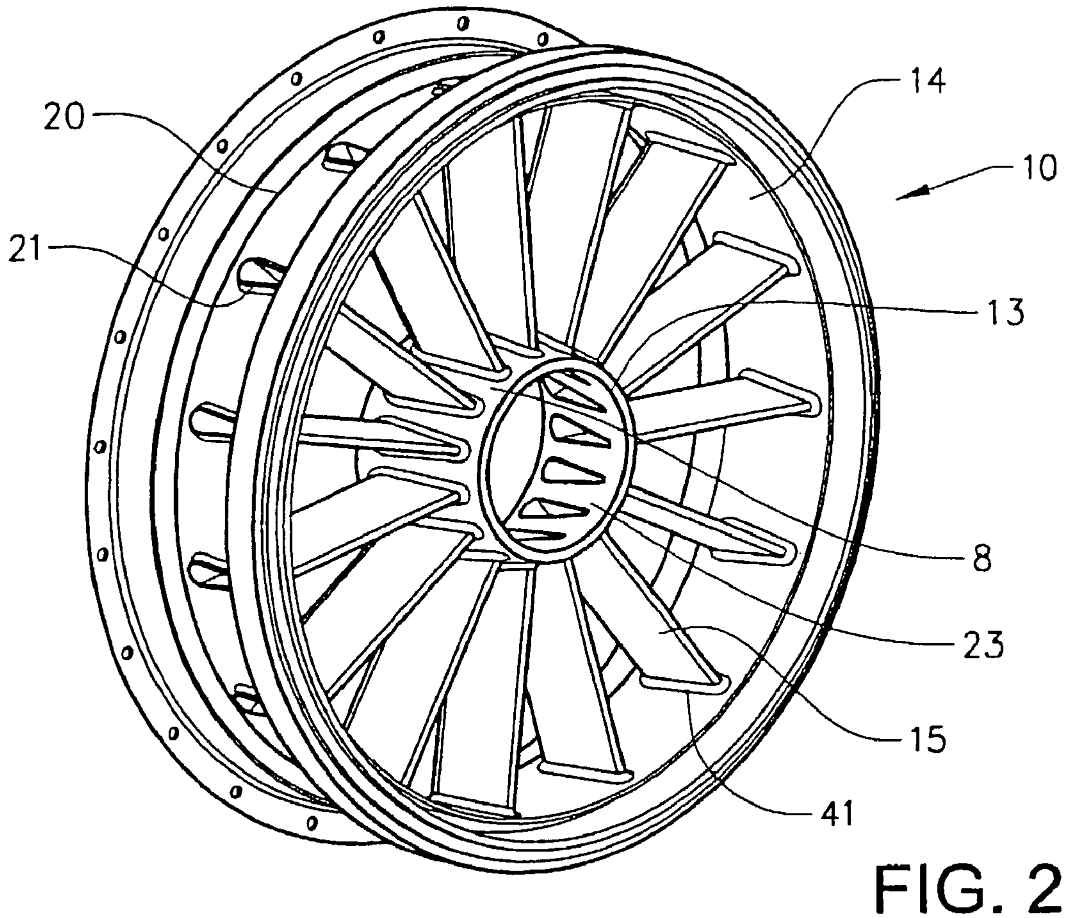
FIG. 2 is a perspective view of the support structure.
Figure 3:
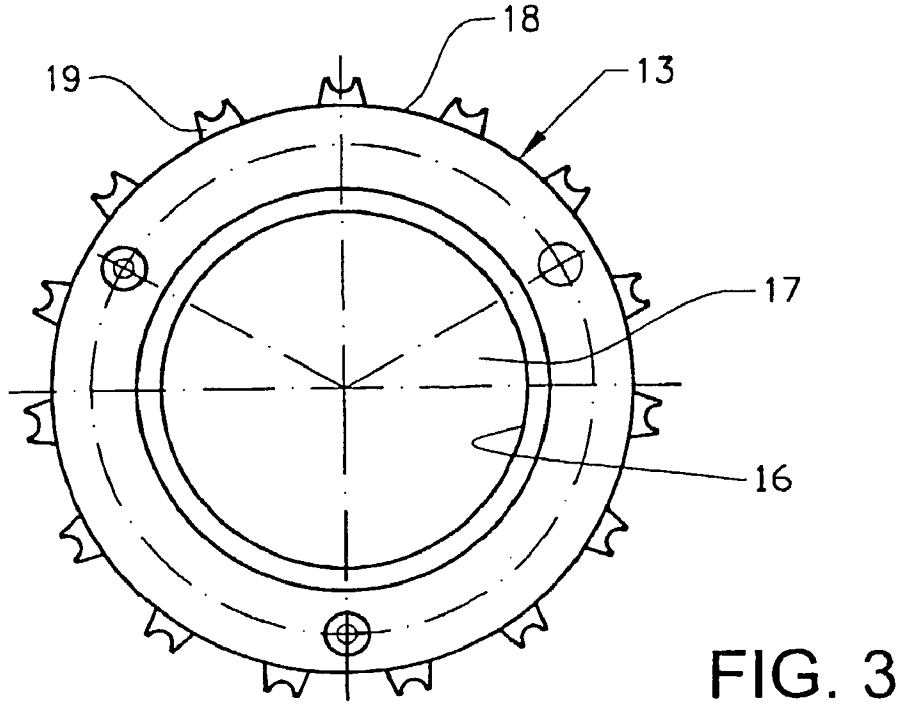
FIG. 3 is an end view of the support structure.

Further with reference to FIGS. 2 and 3 the support structure according to the present invention will be described forming an inlet portion 10 in the shown embodiment and consists mainly of a radially inner support ring 13 and a radially outer support ring 14 interconnected by means of a plurality of radially extending struts 15. The inner ring 13, the outer ring 14 and each strut 15 are separately manufactured as single units. FIG. 3 shows the separate inner ring 13 having an inner circumferential surface 16 enclosing a through hole 17 and forming a support for a bearing, not shown, for the rotational shaft 12 of the rotor. The inner ring 13 further has an outer circumferential surface 18 having preferably shape of a conical mantle surface, from which a plurality of stub ends 19 project radially outwards, one stub end for each strut 15. The stub ends form integral projecting portions of the inner ring 13 and also the outer ring 14.

It is apparent from the drawings that the inlet portion 10 has a hollow design forming internal ducts or channels, 20, 21 , 22, 23. In the outer ring a duct 20 is formed as an annular duct being closed in the mounted state against a tubular portion 23 of the stator 1 , see FIG. 1. Correspondingly the inner ring 13 forms a duct 23 against a circumferential portion of the bearing. The struts 15 and the stub ends 19 projecting from the inner ring 13 and the outer ring 14 form closed ducts 21, 22. The purpose of the duct is to allow heated air to flow through the struts and the inner ring in order to prevent ice to build up on the nose cone 24, the struts 15 and the hub formed by the inner ring 13. Also a risk of building up ice on the movable flap air foils 25, see FIG. 8, will be prevented. As a consequence of the differences of heat energy the outer ring 14 will have a higher temperature than the rest of the inlet portion and will expand, contrary to the other parts of the inlet portion, such as the struts and the inner ring, resulting in stresses which all parts of the structure must withstand. By creating the stub ends 19 forming an integral part of the inner and outer rings 13, 14, weld joints will be achieved having sufficiently high tensile strength.

The inner ring 13 is preferably made as a casting of metal alloys which normally involve tolerances which do not fulfill the high demands of prerequisites for the positioning the struts 15 of the inlet portion 10. Further a continuous step-less transition between stub ends 19 and the struts is of great importance for the maintaining high demands on aero dynamics. Also low weight is of great importance.

Figure 4:
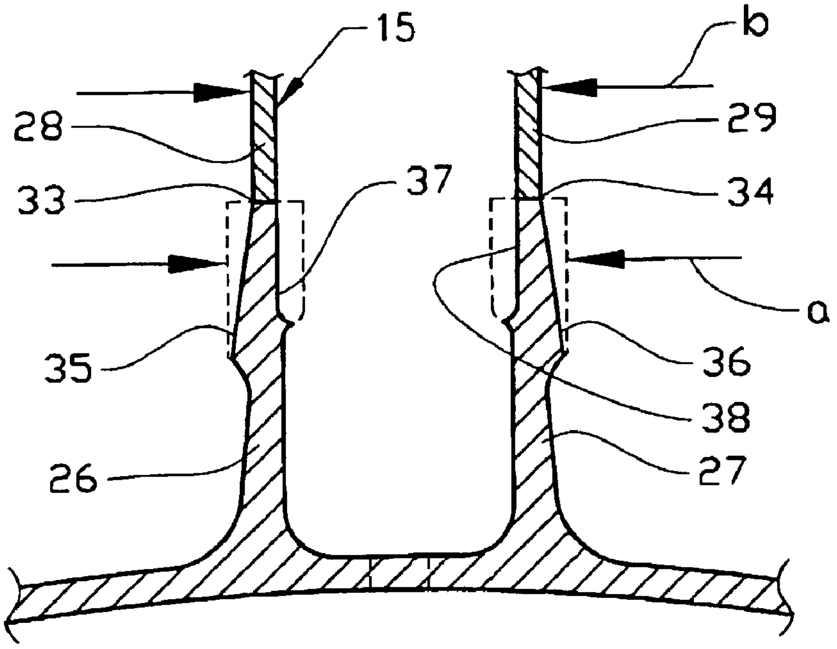
FIGS. 4 and 5 are enlarged broken cross sectional views of portions of the support structure.
Figure 5:
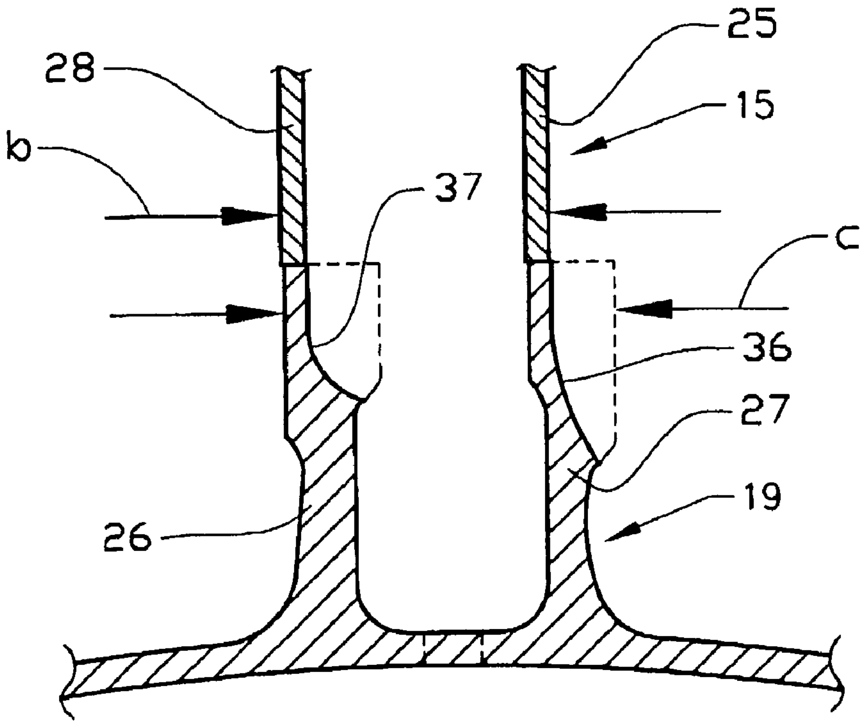

To meet the above demands the stub ends are according to the present invention manufactured by casting initially to have oversized dimensions as to the transverse dimensions of the stub ends 19, i.e. transversally to the longitudinal direction of the struts 15, see dashed lines in FIG. 4 and FIG. 5. By means of the hollow design of the stub ends and struts said parts consist of wall portions 26, 27, 28, 29, name enclosing wall portions and also, in the example as shown, a transverse partition wall portion 30, separating the ducts 21 , 22. The partition wall portion is shown in the stub ends, but corresponding partition wall portion is present in each strut 15. The meaning of the expression over-sized dimensions is that said initial transverse dimension a or c, see FIG. 4 and 5, exceeds clearly the transverse dimension b of the corresponding strut 15 as seen in a radial plane of the stator relative to the longitudinal axis of the shaft 12 of the rotor 2.

After finalizing the casting operation the cast part of the inlet portion, i.e. the inner ring FIG. 13 and possibly also the outer ring 14 will be subject to one or two further dimensioning operation by means of working material in order to adapt the shape and dimensions of the stub ends 19 to the shape and dimensions of each separate strut 15 in such way so that there will be a continuous and step-less transition between the end edges 31 of the stub ends and the corresponding end edges 33, 34 of the struts 15 and further with a highly accurate positioning of the struts 15 in the inlet portion 10 and relative to the corresponding flap 25. It is most important that relative positioning of the struts will be arranged with small tolerances to avoid steps between the struts and the flaps which can create exitations propagating to the fan behind the flaps causing a vane crash.

FIG. 4 shows a reduction of the transverse dimension and adaption to correct position of the strut by removing material from the opposite surfaces 35, 36 of a stub end 19 and also from opposite inner surfaces 37, 38 of a stub end. Possibly, the material from the inner surfaces can be omitted.

FIG. 5 shows an extreme situation having a worst possible tolerance result with respect to especially the positioning of the strut. A relatively large amount of material will be removed on one of the outer sides 36 of the wall 27 of the stub end and the inner side 37 of the opposite wall 26 of the stub end. The removal of the material will preferably be made by for example Electro Discharge Machining (EDM) or Electrochemical Machining (ECM) or milling. EDM uses a pulsed direct current in a non-conductive liquid for spark formation, machining the walls of the struts. ECM utilizes electrical energy for creating a chemical reaction dissolving metal from the strut into an electrolytical solution.

Figure 6:
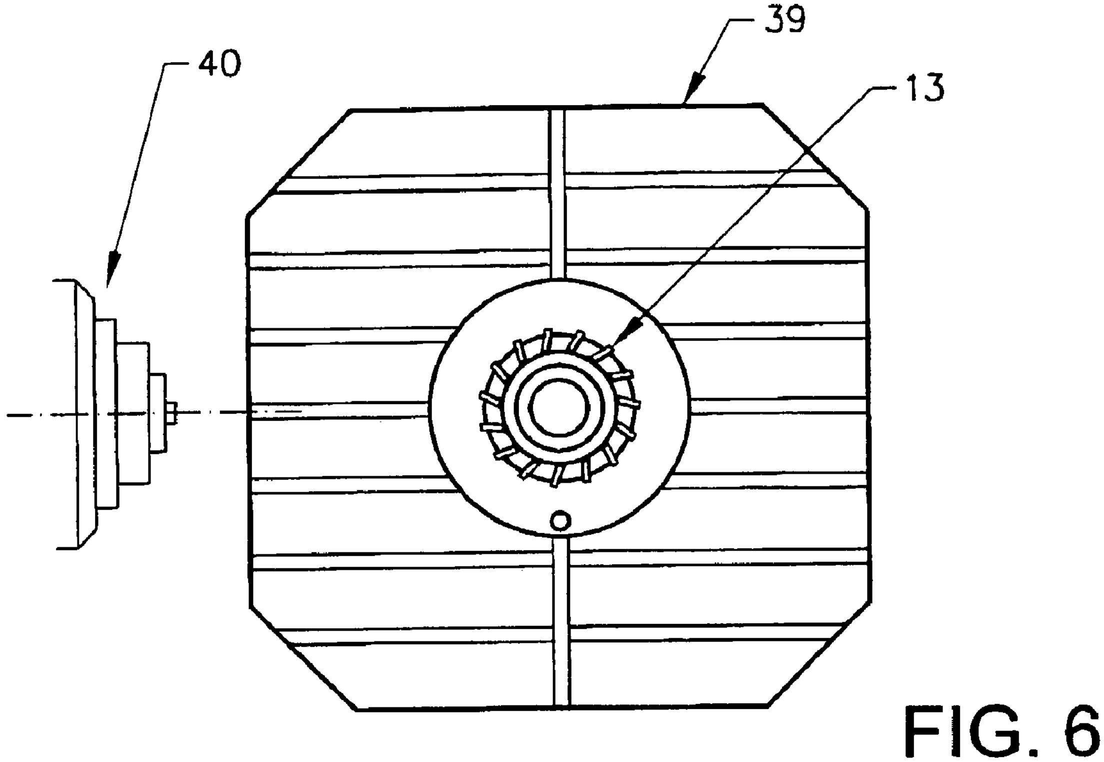
FIG. 6 is a schematic view of an arrangement for accomplishment of the method according to the present invention.
Figure 7:
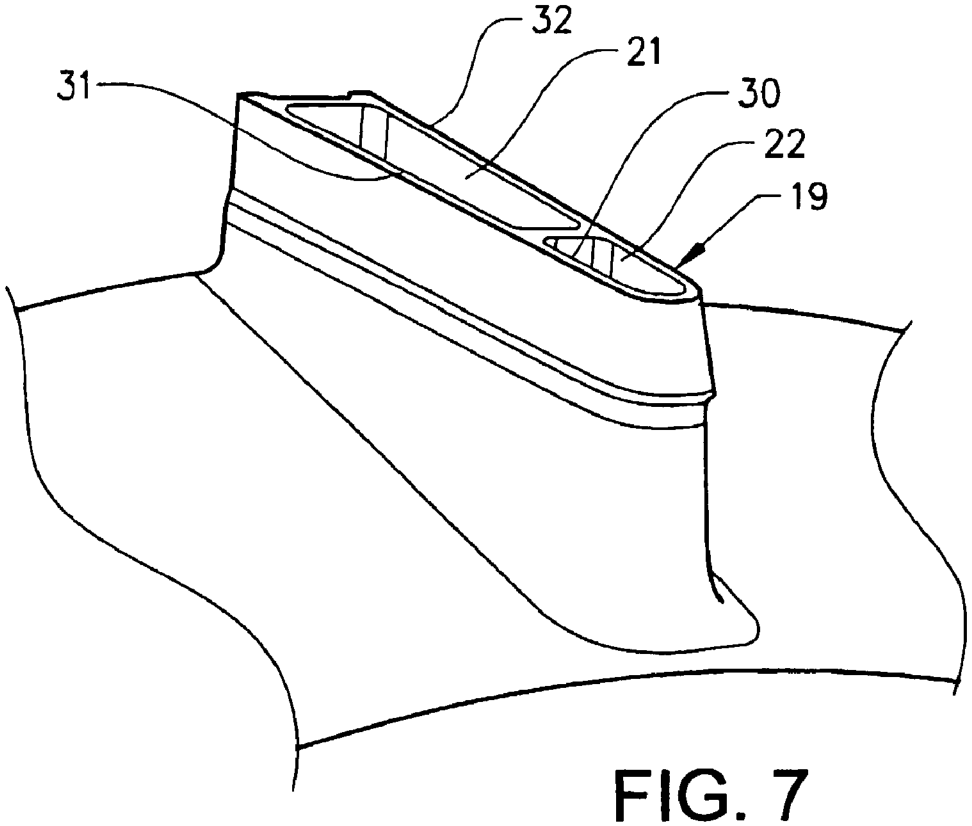
FIG. 7 is a perspective view of a stub end portion forming part of an inner ring of the support structure of the present invention and FIG. 8 is a cross sectional view of a strut and a flap airfoil arranged downstream of the strut.

FIG. 6 shows schematically an arrangement in which the inner ring 13 is mounted in a fixture 39 for removing of material from the wall surfaces of the stub ends 19 by means of a computer controlled working machine 40, such as a milling machine or an EDM apparatus. The machine operates on the basis of input data, including coordinates for each final surface positioning until the final result is achieved for all wall surfaces which avoid from the input data, on a stub end, proceeding with next stub end etc. until all stub ends have been operated on. The struts 15 are correctly positioned and provisionally attached to the stub ends 19 before the removal of material, alternatively the struts are positioned after the material removing operation and a continuous weld are arranged along the whole joint between the end edges 31-34 of each stub end 19 and corresponding strut 15. In the outer ends of the struts corresponding joints are welded between the stub ends 41 projecting inwards from the outer ring 14. This ring 14 can normally be manufactured with low tolerances for example by ECM, involving that no over-sizing followed by material working is necessary. However, principally the same method according to present invention can also be applied to the stub ends of the outer ring 14.

Figure 8:
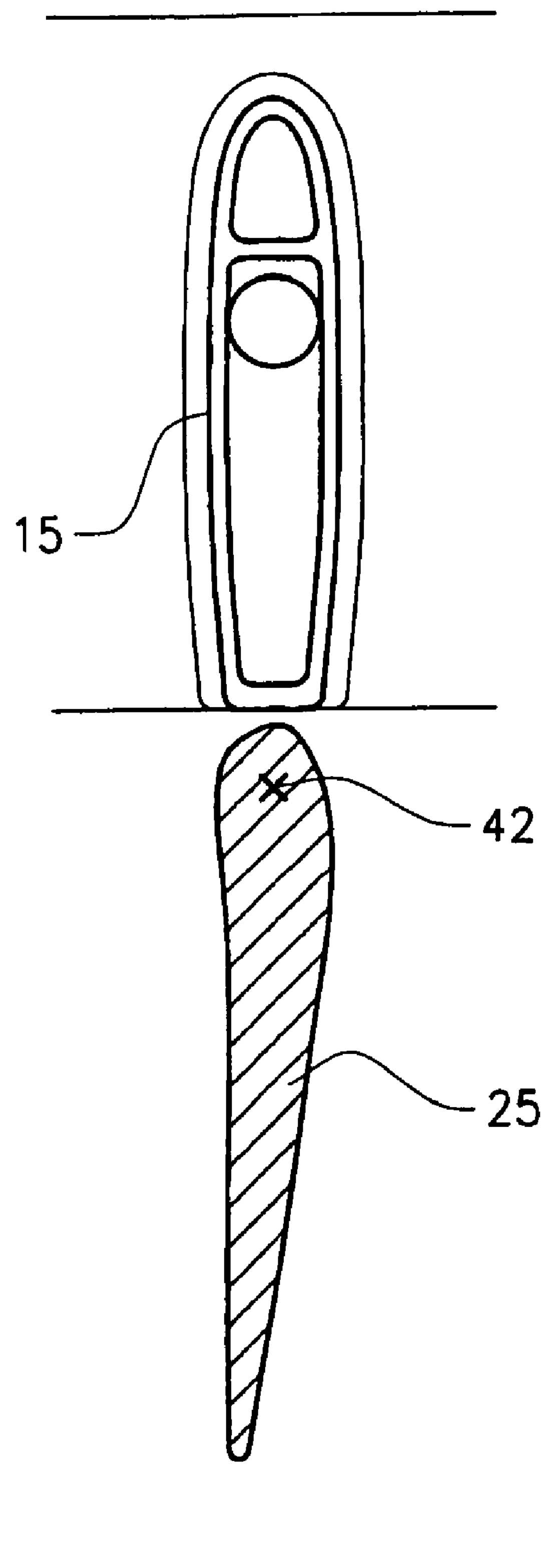

FIG. 8 illustrates the relative positioning of a flap 25 behind one of the struts 15. The flaps 25 are attached to the structure of the stator 1 separately from the struts and are in the example as shown pivotally journalled relative to an axis 42 which extends radially. It is further apparent that the struts and the flap are not symmetrically shaped or positioned, however their positional inter relationship must be arranged with very low tolerances.

In the present application, the use of terms such as "including" is open-ended and is intended to have the same meaning as terms such as "comprising" and not preclude the presence of other structure, material, or acts. Similarly, though the use of terms such as "can" or "may" is intended to be open-ended and to reflect that structure, material, or acts are not necessary, the failure to use such terms is not intended to reflect that structure, material, or acts are essential. To the extent that structure, material, or acts are presently considered to be essential, they are identified as such.

Although the invention has been shown and described with respect to a preferred embodiment thereof it should be understood by those skilled in the art that other various changes and omissions in the form and detail of the invention may be made without departing from the scope thereof.

The invention claimed is:

1. A method for assembling a support structure in a turbine or compressor engine for rotatably supporting a rotor member in a stator member, the support structure including an inner ring, an outer ring and a plurality of struts which extend radially between the inner ring and the outer ring, at least one of the rings having integrated portions projecting in a direction of the struts and forming end connecting portions joined to the struts, comprising:

casting the end connecting portions of the at least one of the rings together with the ring using a metal alloy having initially oversized cross sectional dimensions relative to the cross sectional dimensions of corresponding strut; and working at least one lateral surface of the end connecting portions to remove material, so as to achieve final dimensions and positioning to conform each end connecting portion to cross sectional dimensions and positioning of each corresponding strut, the material being removed from the end connecting portions prior to welding or soldering the end connecting portions to the struts.

2. A method according to claim 1, wherein the working for removal of material is performed by Electro Discharge Machining (EDM).

3. A method according to claim 1, wherein the working for removal of material is performed by Electro Chemical Machining (ECM).

4. A method according to claim 1, wherein the end connecting portions are radially outwardly projecting portions of the inner ring.

5. A method according to claim 1, the struts being provided with ducts enclosed by wail portions, wherein at least two of the lateral surfaces of the wall portions are an outer surface and an inner surface.

6. A method according to claim 5, wherein the lateral surfaces of each end connection portion being opposite outer surfaces and opposite inner surfaces.

7. A method according to claim 1, wherein the struts have substantially final dimensions prior to joining to the end connecting portions.

* * * * *